Aug. 30, 1966  B. D. HART  3,269,109
CLEVIS FOR CONNECTING TOW CHAIN LOOP WITH HITCH DEVICE
Filed June 30, 1964
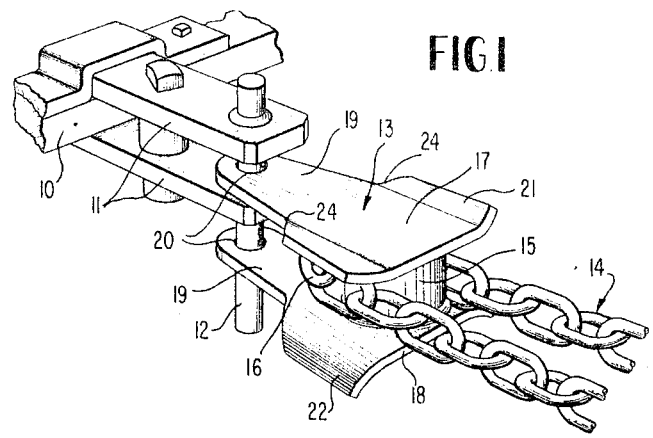
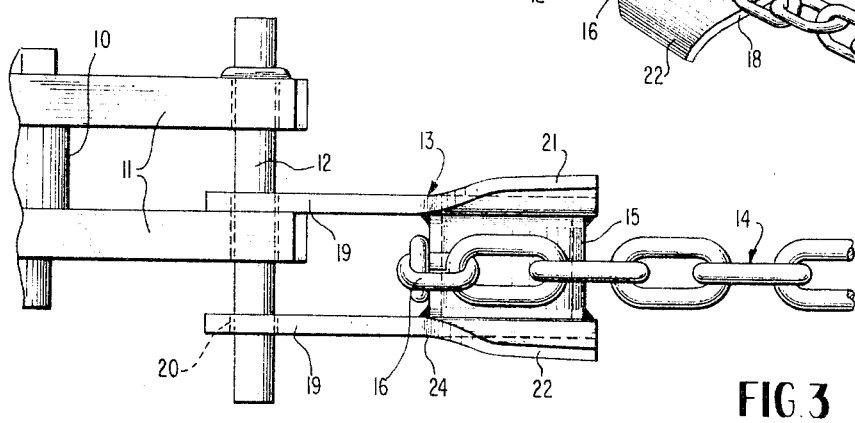
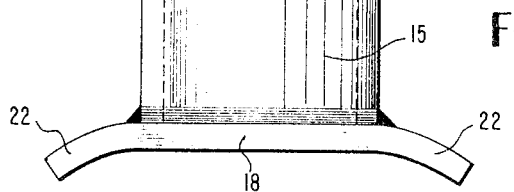
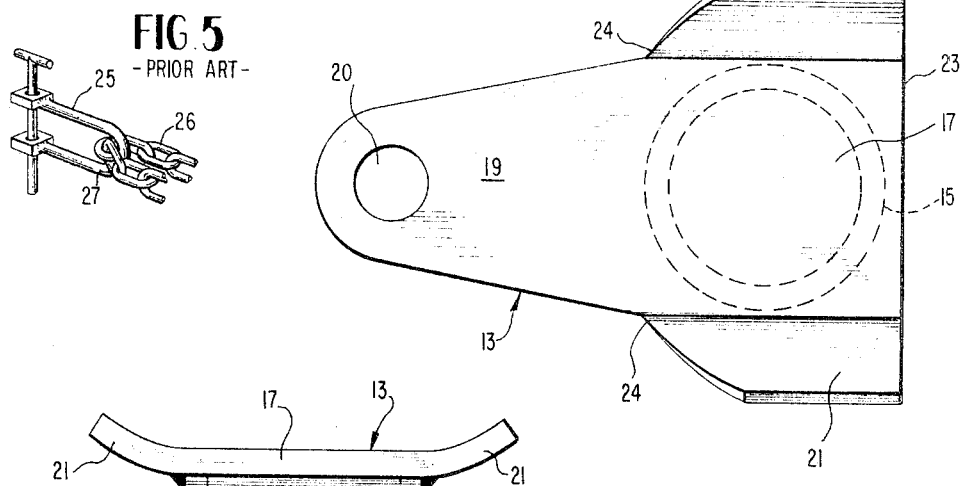
INVENTOR.
BERNIE D. HART
BY
*ATTORNEY*

United States Patent Office 3,269,109
Patented August 30, 1966

3,269,109
CLEVIS FOR CONNECTING TOW CHAIN LOOP
WITH HITCH DEVICE
Bernie Daniel Hart, Devers, Tex.
Filed June 30, 1964, Ser. No. 379,153
3 Claims. (Cl. 59—86)

This invention relates to a clevis or connector for use in connecting agricultural implement tow chains to a tractor hitch and for other like purposes.

The main object of the invention is to provide an improved clevis which will greatly reduce chain breakage and therefore save the farmer and other like users of the invention time and money.

A further object is to provide a clevis which is simplified in construction, symmetrical about its vertical axis to that it has no top or bottom, sturdy and durable, economical to manufacture and reliable in use.

It is customary to drag harrows and other like farm implements behind the farm tractor with the use of a heavy tow chain suitably connected with the tractor hitch or draw bar. It is customary to loop the chain around a conventional clevis or U-bolt which in turn has a pivotal connection with the tractor hitch or draw bar. A difficulty commonly encountered is that the clevis provides such a small surface area of contact with the chain that after only a few hours of engagement and strain, the chain links get hot and break. This of course interrupts the farmer's work and necessitates a costly and time-consuming repair.

Another difficulty is encountered with conventional chain connecting clevises, namely that when the chain is made slack and subsequently placed under tension, there is a severe binding between the chain links and the lower side of the clevis which may cause breakage of the chain. In other words, when initially placed under tension, after being slack, there is no means on the conventional clevis to cause the chain to assume a proper working low friction engagement with the clevis and the chain becomes bound and a link is apt to break.

My invention completely overcomes the above difficulties without adding significant expense to the connector or clevis and the clevis is constructed to provide always a large smooth contact surface for chain engagement around a relatively large cylindrical portion. This consistently distributes the stress and strain on the chain evenly among its multiple links rather than concentrating it on one or two links which are bound due to inadequate engaging surface area. The invention clevis has a second important feature in that it is constructed so that when it is tensioned subsequent to being made slack, it will automatically position itself for proper pulling action without binding. It is thought, after considerable experimentation, that the clevis constructed according to this invention is the only way of accomplishing the above objectives.

Another feature of the invention resides in the fact that the clevis is reversible top-to-bottom and, in effect, has no upper side or lower side but is symmetrical, as previously stated.

Other objects and advantages of the invention will be apparent during the course of the following detailed description.

In the accompanying drawings forming a part of this application and in which like numerals are employed to designate like parts throughout the same.

FIGURE 1 is a perspective view of the invention clevis during use,

FIGURE 2 is a side elevation of the same, with associated elements,

FIGURE 3 is an enlarged plan view of the clevis,

FIGURE 4 is an end elevation of the clevis, and

FIGURE 5 is a fragmentary perspective view showing the prior art.

In the drawings, wherein for the purpose of illustration is shown a preferred embodiment of the invention, attention is directed first to FIGURES 1–4, wherein the numeral 10 designates a tractor draw bar or the like having a hitch including two vertically spaced bars or plates 11, having aligned openings to receive a vertical hitch pin 12. As shown in FIGURES 1 and 2, the invention clevis 13, to be described in detail, is releasably coupled to the tractor hitch through the pin 12 and is also connected with the linked chain 14 which draws a harrow, land leveler, or other like element.

The clevis 13 constituting the invention comprises a relatively large smooth surfaced cylindrical chain-engaging body portion 15 having its axis vertically disposed during use and providing on its forward side a large surface area of contact or at least several links of the chain 14 and generally preventing the chain loop 16 from curving too abruptly or binding. The body portion 15 allows the chain 14 to slide freely with minimum friction on the surface of the cylinder 15 during actual towing, and the chain does not become hot due to friction and is not apt to break. The height of the body portion 15 is somewhat more than the thickness of the chain, as shown clearly in FIGURE 2, but need not be greatly more than the chain thickness. In this connection, the clevis 13 may obviously be made in various sizes to accommodate various apjplications and various chain sizes. However, the proportions of the clevis remain unchanged in all instances.

The clevis further embodies identical upper and lower plates 17 and 18, preferably welded to the ends of body portion 15, symmetrically and in parallel opposed relation and rigid therewith. The plates 17 and 18 have forward somewhat tapering longitudinal extensions 19 integral therewith and extending a substantial distance forwardly of the body portion 15 and having aligned apertures 20 near their forward tips to receive the pin 12, in the manner shown.

As best shown in FIGURE 3, the main rear portions of plates 17 which are flat extend somewhat beyond the periphery of the cylindrical body portion 15 on all sides thereof. At diametrically opposite sides of the cylindrical body portion 15, and at the top and bottom thereof, the plates 17 and 18 carry integral upturned and downturned lateral extensions or wings 21 and 22 which extend from the back straight edge 23 of the clevis forwardly to points 24, substantially in lateral alignment with the forward side of chain-engaging body portion 15. The extensions 21 and 22, as shown in FIGURE 4, are gently curved away from the ends of the body portion 15 but project generally radially outwardly therefrom along the opposite longitudinal sides of the clevis.

As best shown in FIGURE 1, the plates 17 and 18 including the wing extensions 21 and 22 form a smooth surfaced support for the chain 14 to prevent the same from dropping downwardly when slackened. Consequently, when the load or tension is again placed on the chain the lowermost plate 18 will guide the chain loop into smooth non-binding engagement with the cylindrical portion 15. The inclined wings 22 will also guide the slackened sides of the chain loop into proper pulling engagement with the clevis. As previously stated, the clevis is reversible and has no top or bottom and either plate 17 or 18 may be arranged at the bottom with the identical results. The entire clevis 13 is pivoted through the pin 12 to the tractor hitch and thus constitutes a swiveled and free floating link between the tractor hitch and the tow chain. The chain loop 16 may slide freely on the cylindrical body portion 15 and either plate 17 or 18 without excessive friction, and this materially lessens the tendency of the chain to break during use.

If desired, the areas of the plates 17 and 18 at the opposite ends of the cylindrical portion 15 may be provided with openings registering with the bore of the portion 15. This is merely to lighten the construction and is an optical feature, not shown in the drawings, and not effecting the operation of the device.

The clevis 13 is therefore characterized by the large surface area upright cylindrical chain-engaging body portion 15 and the top and bottom identical parallel spaced opposed plates 17 and 18 which are sufficiently broad to support the chain loop at all times, FIGURE 1, and including the inclined extensions 21 and 22 for assuring proper guidance of the opposite sides of the chain loop back into pulling engagement after being slackened and perhaps hanging close to the ground.

It is believed that the purpose and mode of operation of the clevis will now be fully apparent to those skilled in the art without any further description.

FIGURE 5 merely shows a typical illustration of a common prior art type of clevis 25 connected with a loop of chain 26 by means of the clevis bight portion 27. It is this type of arrangement which causes chain binding and breakage as previously discussed and it is this arrangement which the invention overcomes and improves.

It is to be understood that the form of the invention herewith shown and described is to be taken as a preferred example of the same, and that various changes in the shape, size and arrangement of parts may be resorted to, without departing from the spirit of the invention or scope of the subjoined claims.

Having thus described my invention, I claim:

1. A clevis for connecting a heavy looped farm implement tow chain with a tractor hitch or the like comprising a relatively large diameter smooth cylindrical chain loop engaging body portion which is upright during use and of a sufficient axial length to accommodate the chain loop with some space above and below the chain loop, and a pair of opposed parallel plates rigidly secured to opposite ends of said body portion for confining the chain loop on the body portion and each adapted to support the weight of the chain loop when arranged lowermost and while the chain is slackened, said plates including forwardly projecting apertured extensions adapted to receive a vertical hitch pin pivotally a substantial distance forwardly of the body portion, and said plates including opposite side inclined extensions which extend longitudinally adjacent the body portion and generally radially of the same and away from opposite ends thereof, said extensions adapted to guide the sides of the chain loop into proper non-binding engagement with the body portion after slackening and retensioning of the chain.

2. The invention as defined by claim 1, and wherein said inclined extensions are generally curved laterally and constitute diverging pairs on opposite sides of the cylindrical body portion at the top and bottom thereof, said clevis being symmetrical and reversible top-for-bottom during use.

3. A clevis for connecting a looped tow chain with a vehicle comprising an upstanding cylindrical body portion of sufficient diameter to be engaged by a substantial number of chain links in the loop of chain and of a sufficient axial length to accommodate the full width of the chain, and plates secured to opposite ends of said body portion in substantially parallel vertically spaced relation during use, said plates adapted near their forward ends for connection with a vehicle hitch means well forwardly of the body portion, said plates provided on opposite sides of the body portion with tilted curved guide extensions for supporting and guiding the sides of the chain loop into proper non-binding engagement with the body portion, either of said plates adapted to be arranged lowermost during use and then constituting a substantially level support for the chain loop.

References Cited by the Examiner
UNITED STATES PATENTS

| 2,709,616 | 5/1955 | Larson | 59—86 |
| 2,823,944 | 2/1958 | Anderson | 294—82 |

CHARLES W. LANHAM, *Primary Examiner.*

G. P. CROSBY, *Assistant Examiner.*